United States Patent
Heilmann et al.

[11] Patent Number: 5,856,046
[45] Date of Patent: Jan. 5, 1999

[54] PRODUCTION OF ELECTRODES

[75] Inventors: Peter Heilmann, Bad Dürkheim; Helmut Steininger, Worms, both of Germany

[73] Assignee: EMTEC Magnetics GmbH, Ludwigshafen, Germany

[21] Appl. No.: 700,852

[22] Filed: Aug. 21, 1996

[30] Foreign Application Priority Data

Sep. 2, 1995 [DE] Germany .................. 195 32 507.9

[51] Int. Cl.$^6$ .................................................. H01M 4/75
[52] U.S. Cl. .................. 429/233; 429/242; 427/126.3; 427/126.6; 427/289
[58] Field of Search .................................. 429/233, 242, 429/126.3, 126.6, 289; 427/293

[56] References Cited

U.S. PATENT DOCUMENTS

| | | | |
|---|---|---|---|
| 4,099,309 | 7/1978 | Bender | 429/242 X |
| 5,296,318 | 3/1994 | Gozdz et al. | 429/192 |
| 5,554,463 | 9/1996 | Marincic et al. | 429/233 |

FOREIGN PATENT DOCUMENTS 2103759  8/1994  Canada .

OTHER PUBLICATIONS

*Ullmann's Enc. of Ind. Chem.*, 5th Ed., vol. A3, 1985, pp. 343–397. (Month N/A).
*Ullmann's Enc. of Ind. Chem.*, 5th Ed., vol. A5, pp. 95–163. (Month N/A).
*Kirk–Othmer Enc. of Chem. Tech.*, 3rd Ed., 1979, pp. 386–481. (Month N/A)

*Primary Examiner*—Stephen Kalafut
*Attorney, Agent, or Firm*—Keil & Weinkauf

[57] ABSTRACT

Electrodes suitable for electrochemical cells are produced by
  a) applying a mixture comprising
    α) a solid III which can reversibly take up or release lithium ions in an electrochemical reaction and
    β) a binder IV, or a compound which can be converted into a binder IV, to an electrically conductive support V by means of a coating apparatus II with essentially linear relative motion (R) of the support V relative to the coating apparatus II in such a way that an uncoated zone remains on the support V at each of the two margins of the coating apparatus II running parallel to the relative motion (R) and
  b) cutting the support V at an angle of from 5 to 85 degrees to the normal to the direction of relative motion (R) to give essentially parrallel strips.

7 Claims, 1 Drawing Sheet

PRODUCTION OF ELECTRODES

SUMMARY OF THE INVENTION

The present invention relates to a process for producing electrodes suitable for electrochemical cells by a) applying a mixture comprising
   α) a solid III which can reversibly take up or release lithium ions in an electrochemical reaction and
   β) a binder IV, or a compound which can be converted into a binder IV, to an electrically conductive support V by means of a coating apparatus II with essentially linear relative motion (R) of the support V relative to the coating apparatus II in such a way that an uncoated zone remains on the support V at each of the two margins of the coating apparatus II running parallel to the relative motion (R) and b) cutting the support V at an angle of from 5 to 85 degrees to the normal to the direction of relative motion (R) to give essentially parallel strips.

The invention also relates to electrodes obtainable by this process and electrochemical cells containing such electrodes.

BACKGROUND OF THE INVENTION

Electrochemical, in particular rechargeable, cells are generally known, for example from "Ullmann's Encyclopedia of Industrial Chemistry", 5th edition, Vol. A3, VCH Verlagsgesellschaft mbH, Weinheim, 1985, pages 343–397.

Among these cells, lithium batteries occupy a special position, in particular as secondary cells, owing to their high specific energy storage density.

As already known, for example from DE-A 4328785, the cathodes of such cells comprise, as a compound capable of an electrochemical reaction, mixed oxides comprising lithium ions and manganese, cobalt or nickel ions, as can be represented in the stoichiometrically simplest case by the formulae $LiMn_2O_4$, $LiCoO_2$ or $LiNiO_2$.

These mixed oxides react reversibly with compounds which can incorporate lithium ions into their lattice, for example graphite, with the small lithium ions migrating from the crystal lattice and the metal ions such as manganese, cobalt or nickel ions in the latter being oxidized. This reaction can be utilized for electricity storage in an electrochemical cell by separating the compound taking up lithium ions, ie. the anode material, from the mixed oxide by means of an electrolyte through which the lithium ions migrate from the mixed oxide into the anode material.

When the cell is charged, electrons flow through an external voltage source and lithium cations flow through the electrolyte to the graphite. On utilization of the cell, the lithium cations flow through the electrolyte while the electrons flow through a load resistance from the graphite to the mixed oxide.

The electrodes of the electrochemical cells comprise a support, usually a metal, and, applied thereto, a binder layer in which the anode material, usually graphite, or the mixed oxide as cathode material are finely distributed. To coat the support, a suspension of the electrode materials and a solution of the binder are applied to the support, after which the solvent is evaporated.

To make possible output or input of power to the electrodes via contact points, the support may at these contact points have no coating which is known to have a high electrical resistance.

This has been achieved hitherto by printing the coating onto the support in the desired geometry and subsequently stamping the electrode including the contact point from the support material.

This process does not lead to satisfactory products, since the uniformity of the coating thickeners required for the operation of effective batteries cannot be achieved. Furthermore, this process has to be completely converted on each change of the electrode size.

To eliminate these disadvantages it has been proposed to completely coat the support, to stamp out the electrode including the contact point and subsequently to again remove the coating in the region of the contact point.

This process is technically very complicated and runs the risk of damaging the support material when removing the coating.

DETAILED DESCRIPTION OF THE INVENTION

Figure 1:
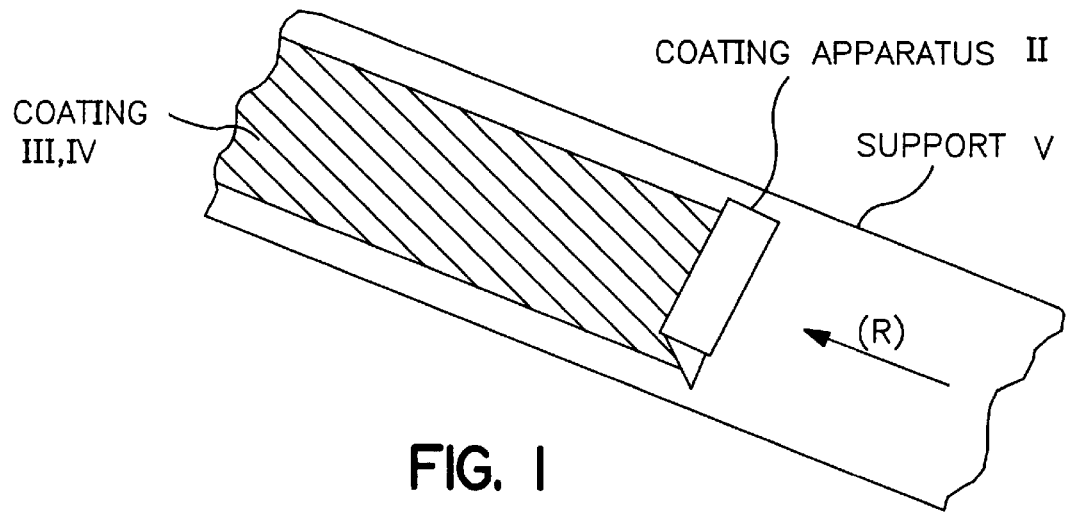
FIG. 1 shows a schematic diagram of the process of applying a mixture of compound III and a binder IV or a compound which can be converted into a binder IV (coating) to a support V be means of a coating apparatus II, whereby an uncoated zone is left on both sides of the support.
Figure 2:
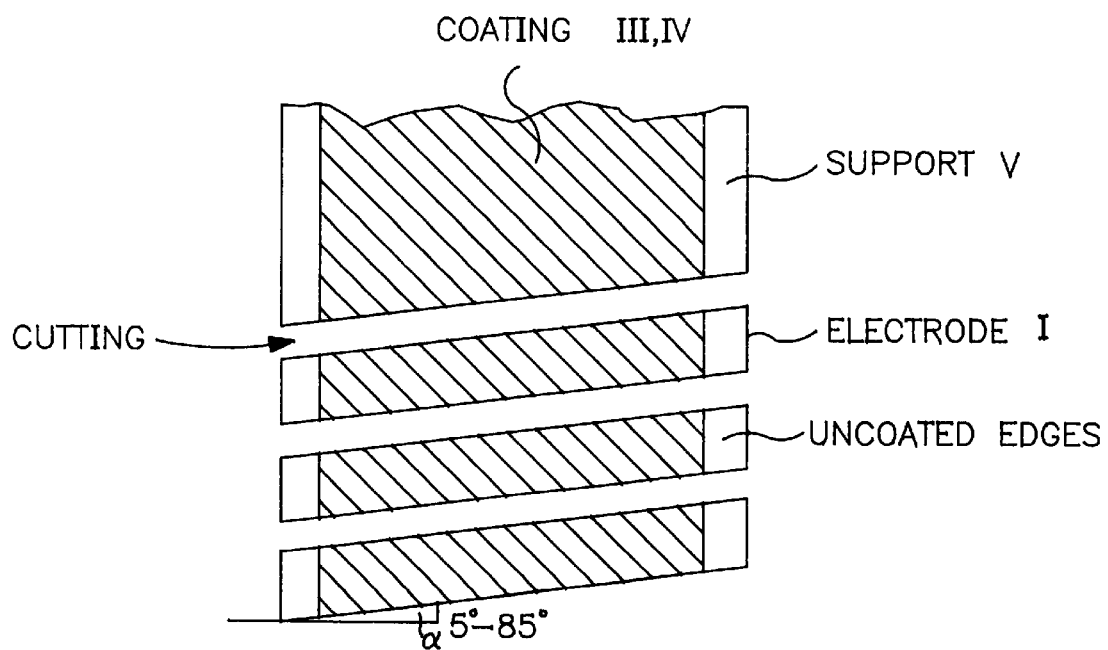
FIG. 2 shows a schematic diagram of the cut electrodes having uncoated areas on both ends thereof as well as the cutting angle.

It is an object of the present invention to provide a solution to the disadvantages mentioned.

We have found that this object is achieved by the process defined in the introduction.

Suitable electrochemically reactive compounds III, which can reversibly take up or release lithium ions, are the substances customarily used for electrode materials in electrochemical cells and also mixtures of such substances.

These are, in particular, those compounds III which incorporate lithium ions with simultaneous uptake of electrons or release lithium ions with simultaneous release of electrons. In the case of rechargeable batteries, these processes should be very largely reversible. To generate the electric potential difference between the two electrodes which is necessary for the storage of electrical energy, this incorporation or release of lithium has to occur at different electrochemical potentials in the two electrode materials.

Suitable anode materials are those compounds III which incorporate lithium ions with uptake of electrons at a high electrochemical potential, for example carbon in a wide variety of forms such as natural and synthetic graphites, cokes and carbon blacks or mixtures of such forms of carbon. The carbon can here be modified by various measures, for example oxidation or sulfonation.

Such carbons are known, for example, from "Ullmann's Encyclopedia of Industrial Chemistry", 5th edition, Vol. A5, VCH Verlagsgesellschaft mbH, Weinheim, 1986, pages 95–163.

Suitable compounds III which can release lithium ions at a low electrochemical potential and are usually used in cathode materials, for example opposite carbon, are salts or salt-like compounds such as chlorides, sulfides and, in particular, oxides of metals which make possible a reversible valence change without significant irreversible destruction of the salt structure or the salt-like structure and with very largely reversible incorporation or release of the lithium ions, for example compounds of Ti, Mn, Co, Ni, Mo or Fe or mixtures of such compounds.

Such compounds can occur in various crystal structures such as sheet structures or, in particular, the spinel structure.

Particularly suitable are mixed oxides containing Mn, Co or Ni. The mixed oxides can additionally contain lithium or, for modifying the use properties, further metal atoms.

The mixed oxides can be prepared in a manner known per se by solid-state or liquid-phase reactions from suitable precursors, in particular from salts containing the corresponding metals, with properties such as specific surface area which, measured in accordance with DIN 66132, is from 0.1 to 30 $m^2/g$, preferably from 0.1 to 20 $m^2/g$, the specific energy density which is from 50 to 200 mAh/g, preferably from 100 to 200 mAh/g, or the cyclability in respect of charging and discharging being able to be optimized by means of a few simple preliminary experiments.

Suitable binders IV or compounds which can be converted into a binder IV are the polymers, in particular highly fluorinated polymers, known per se and also mixtures of such compounds.

Suitable highly fluorinated polymers are particularly those which can be obtained by polymerization of highly fluorinated or perfluorinated olefins such as tetrafluoroethene, 1,1-difluoroethene and hexafluoropropene and also mixtures of such olefins. Such polymers are described, for example, in U.S. Pat. No. 5,296,318.

To carry out the coating, at least one compound III can be mixed in a manner known per se with at least one binder IV or at least one compound which can be converted into a binder IV and, if desired, additives such as fillers, in the absence of solvent or preferably in the presence of a liquid diluent.

Suitable organic diluents are aliphatic ethers, in particular tetrahydrofuran and dioxane, hydrocarbons such as toluene and xylene and, in particular, hydrocarbon mixtures such as petroleum spirit, aliphatic esters, in partiuclar ethyl acetate and butyl acetate, and ketones, in particular acetone, ethyl methyl ketone and cyclohexanone. In some cases water is also suitable as long as it can be completely removed after the support has been coated. It is also possible to use mixtures of such diluents.

Known suitable fillers which can be used are inorganic and organic pigments such as silicon dioxide, titanium dioxide and carbon, in partiuclar carbon black and graphite.

According to the invention, the mixture is applied to an electrically conducting support V by means of a coating apparatus II with essentially linear relative motion (R) in such a way that an uncoated zone remains on the support V on each of the two margins of the coating apparatus II running parallel to the relative motion (R).

Support materials V which can be used are the customary rigid or flexible, electrically conductive support materials, in particular foils of copper and aluminum which generally have thicknesses of from 1 to 50 $\mu$m and in particular from 10 to 20 $\mu$m.

When using expanded metal as support material V, the two full-surface margins which such expanded metal bands customarily have can advantageously be used completely or partially as uncoated contact points.

Suitable coating apparatuses II are blade coaters, extrusion coaters, brush coaters, roller coaters, curtain coaters, meniscus coaters, guide coaters and roller applicators known per se. Such apparatuses are described, for examples in "Kirk-Othmer, Encyclopedia of Chemical Technology", 3rd edition, Vol. 6, John Wiley & Sons, New York, 1979, pages 386–481.

During coating, the support V and the coating apparatus II are, according to the invention, moved relative to one another. The direction of motion should here be essentially linear so that the two margins of the coated band run essentially straight and parallel to one another. The velocity of motion depends on the particular coating apparatus II and can be optimized by means of a few simple preliminary experiments.

The thickness of the electrode material coating on the support material should advantageously be from 50 to 500 $\mu$m, in partiuclar from 100 to 300 $\mu$m.

In the production of the electrodes, a plurality of layers can be applied to the support material.

As further processing steps, the liquid diluent can be removed and the binder can be, insofar as it is crosslinkable, cured or calendered.

The coated support is subsequently divided into essentially parallel strips at an angle a of from 5 to 85 degrees to the normal to the direction of relative motion (R), for example by stamping or cutting.

Selection of the angle $\alpha$ enables the ratio of the length of the coated strips to the coating width of the apparatus II to be set, giving ratios of from 1.005 to 10 corresponding to $(\cos \alpha)^{-1}$.

According to the invention, the strips have uncoated support material at both ends, which can be used as a contact point for the electrodes.

The electrodes of the invention can be used in electrochemical cells in a manner known per se.

Suitable electrolytes are the customary organic compounds, preferably esters such as ethylene carbonate, propylene carbonate, dimethyl carbonate and diethyl carbonate or mixtures of such compounds.

The electrolyte can advantageously comprise a conductance salt, in particular one containing lithium ions, such as $LiPF_6$, $LiAsF_6$, $LiSbF_6$, $LiClO_4$, $LiN(CF_3SO_2)_2$, $LiBF_4$ or $LiCF_3SO_3$.

Such electrochemical cells generally produce a potential difference of from 3.0 to 4.5 V.

We claim:

1. A process for producing electrodes (I) suitable for electrochemical cells, which comprises
   a) applying, by means of a coating apparatus (II), a mixture comprising
      $\alpha$) a compound (III) which can reversibly take up or release lithium ions in an electrochemical reaction and
      $\beta$) a binder (IV), or a compound which can be converted into a binder (IV), to an electrically conductive support (V) with essentially linear relative motion (R) of the support (V) relative to the coating apparatus (II) in such a way that an uncoated zone remains on the support (V) at each of the two margins of the coating apparatus (II) running parallel to the relative motion (R) and
   b) dividing the support (V) at an angle of from 5 to 85 degrees to the normal to the direction of relative motion (R) to give essentially parrallel strips.

2. A process as claimed in claim 1, wherein carbon is used as compound (III).

3. A process as claimed in claim 1, wherein a mixed oxide containing Mn, Co, Ni, Fe or Mo ions and lithium ions is used as compound (III).

4. A process as claimed in claim 1, wherein a metal foil is used as support (V).

5. A process as claimed in claim 1, wherein an expanded metal is used as support (V).

6. An electrode obtainable by a process as claimed in claim 1.

7. An electrochemical cell comprising an electrode as claimed in claim 6.

* * * * *